United States Patent
Yano et al.

(10) Patent No.: US 10,087,942 B2
(45) Date of Patent: Oct. 2, 2018

(54) MOTOR DRIVEN COMPRESSOR

(71) Applicant: KABUSHIKI KAISHA TOYOTA JIDOSHOKKI, Kariya-shi, Aichi-ken (JP)

(72) Inventors: Junya Yano, Kariya (JP); Akio Fujii, Kariya (JP); Junichi Takahata, Kariya (JP)

(73) Assignee: KABUSHIKI KAISHA TOYOTA JIDOSHOKKI, Kariya-shi, Aichi-ken (JP)

( * ) Notice: Subject to any disclaimer, the term of this patent is extended or adjusted under 35 U.S.C. 154(b) by 384 days.

(21) Appl. No.: 14/312,848

(22) Filed: Jun. 24, 2014

(65) Prior Publication Data
US 2014/0377094 A1  Dec. 25, 2014

(30) Foreign Application Priority Data

Jun. 25, 2013 (JP) ................................ 2013-132613

(51) Int. Cl.
*F04D 25/06* (2006.01)
*F04B 27/08* (2006.01)
(Continued)

(52) U.S. Cl.
CPC ...... *F04D 25/0693* (2013.01); *F04B 27/0873* (2013.01); *F04B 35/04* (2013.01);
(Continued)

(58) Field of Classification Search
CPC . F04D 25/0693; H02K 11/33; F04C 18/0215; F04C 23/008; F04B 35/04; F04B 27/0873; F04B 39/121
(Continued)

(56) References Cited

U.S. PATENT DOCUMENTS 6,619,933 B2 * 9/2003 Ikeda ................. F04B 39/06
417/410.1
7,972,123 B2 * 7/2011 Koide ................ F04B 27/0873
417/411
(Continued)

FOREIGN PATENT DOCUMENTS

EP  1363026 A2  11/2003
EP  1450044 A2   8/2004
(Continued)

OTHER PUBLICATIONS

Communication dated Oct. 30, 2014 from the European Patent Office in counterpart application No. 14173415.2.

Primary Examiner — Charles Freay
Assistant Examiner — Lilya Pekarskaya
(74) Attorney, Agent, or Firm — Sughrue Mion, PLLC

(57) ABSTRACT

A motor-driven compressor that includes a compression unit adapted to compress refrigerant, an electric motor adapted to drive the compression unit, and a housing that accommodates the compression unit and the electric motor and includes a coupling member. A motor driving circuit drives the electric motor. The motor driving circuit includes a circuit board and a capacitor, which is electrically connected to the circuit board. A capacitor holder holds the capacitor and is coupled to the coupling member. One of the capacitor holder and the coupling member includes a projection, and the other one of the capacitor holder and the coupling member includes an engagement portion that engages with the projection. Engagement between the projection and the engagement portion positions the capacitor holder relative to the coupling member.

10 Claims, 4 Drawing Sheets

(51) Int. Cl.
*F04B 35/04* (2006.01)
*F04C 23/00* (2006.01)
*F04B 39/12* (2006.01)
*H02K 11/33* (2016.01)

(52) U.S. Cl.
CPC .......... *F04B 39/121* (2013.01); *F04C 23/008* (2013.01); *H02K 11/33* (2016.01); *F04C 2240/805* (2013.01); *F04C 2240/808* (2013.01)

(58) Field of Classification Search
USPC ................................ 417/410.1; 310/68 R, 44
See application file for complete search history.

(56) References Cited

U.S. PATENT DOCUMENTS

| | | | |
|---|---|---|---|
| 8,451,611 | B2 | 5/2013 | Nakagami et al. |
| 2003/0200761 | A1 | 10/2003 | Funahashi et al. |
| 2005/0063836 | A1 | 3/2005 | Kimura et al. |
| 2005/0223727 | A1 | 10/2005 | Funahashi et al. |
| 2006/0064998 | A1 | 3/2006 | Funahashi et al. |
| 2011/0189035 | A1* | 8/2011 | Nakagami ............... F04B 39/06 417/410.5 |
| 2012/0175981 | A1 | 7/2012 | Enami et al. |
| 2012/0237376 | A1 | 9/2012 | Kinoshita et al. |
| 2013/0021753 | A1 | 1/2013 | Enami et al. |
| 2014/0313806 | A1* | 10/2014 | Shinohara .......... H05K 7/20927 363/141 |

FOREIGN PATENT DOCUMENTS

| | | |
|---|---|---|
| EP | 2500516 A2 | 9/2012 |
| EP | 2549844 A1 | 1/2013 |
| JP | 2004-044555 A | 2/2004 |
| JP | 2007-263061 A | 10/2007 |
| JP | 2011-157873 A | 8/2011 |
| JP | 2011182500 A | 9/2011 |
| JP | 2011220308 A | 11/2011 |
| JP | 2012156496 A | 8/2012 |
| JP | 201394022 A | 5/2013 |
| JP | 2014-020321 A | 2/2014 |
| WO | 2006/080698 A1 | 8/2006 |

* cited by examiner

MOTOR DRIVEN COMPRESSOR

BACKGROUND OF THE INVENTION

The present invention relates to a motor-driven compressor that includes a compression unit, which compresses refrigerant, an electric motor, which drives the compression unit, and a motor driving circuit, which drives the electric motor.

Japanese Laid-Open Patent Publication No. 2007-263061 describes an example of a motor-driven compressor. The motor-driven compressor includes a motor driving circuit, which includes a planar circuit board and various types of electric components. The electric components, which are electrically connected to the circuit board, include a switching element and a plurality of capacitors, for example. The capacitors are held by a capacitor holder, which is coupled to a coupling member (coupling base) forming a portion of the housing.

When connecting the capacitors to the circuit board, the capacitors are held by the capacitor holder, which is coupled to the coupling base. Displacement of the capacitor holder relative to the coupling member from the predetermined position shifts each capacitor away from the corresponding connection location on the circuit board. This hinders the connection of the capacitors to the circuit board.

It is an object of the present disclosure to provide a motor-driven compressor that facilitates the connection of a capacitor to a circuit board.

To achieve the above object, one aspect of the present invention is a motor-driven compressor that includes a compression unit adapted to compress refrigerant, an electric motor adapted to drive the compression unit, and a housing that accommodates the compression unit and the electric motor and includes a coupling member. A motor driving circuit drives the electric motor. The motor driving circuit includes a circuit board and a capacitor, which is electrically connected to the circuit board. A capacitor holder holds the capacitor and is coupled to the coupling member. One of the capacitor holder and the coupling member includes a projection, and the other one of the capacitor holder and the coupling member includes an engagement portion that engages with the projection. Engagement between the projection and the engagement portion positions the capacitor holder relative to the coupling member.

Other aspects and advantages of the present invention will become apparent from the following description, taken in conjunction with the accompanying drawings, illustrating by way of example the principles of the invention.

BRIEF DESCRIPTION OF THE DRAWINGS

The invention, together with objects and advantages thereof, may best be understood by reference to the following description of the presently preferred embodiments together with the accompanying drawings in which.

DETAILED DESCRIPTION OF THE INVENTION

Referring to FIGS. 1A to 4, one embodiment will now be described.

Figure 1A:
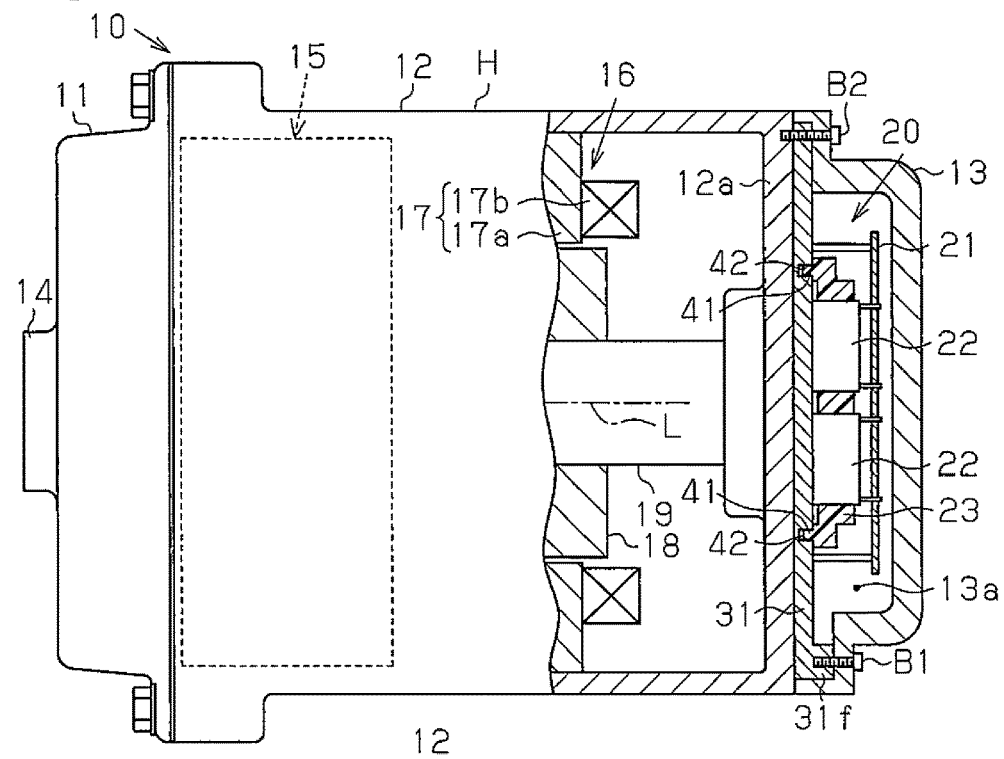
FIG. 1A is a partial cross-sectional view showing a motor-driven compressor of one embodiment.

As shown in FIG. 1A, a motor-driven compressor 10 includes a housing H. The housing H includes a discharge housing member 11, a suction housing member 12, and a cover 13, which are made of a metal, preferably aluminum. The discharge housing member 11, the suction housing member 12, and the cover 13 are cylindrical, and each includes a closed end. The suction housing member 12 is coupled to the discharge housing member 11. The suction housing member 12 has a circumferential wall including a suction port (not shown) connected to an external refrigerant circuit (not shown). The discharge housing member 11 includes a discharge port 14 connected to the external refrigerant circuit. The suction housing member 12 accommodates a compression unit 15 (indicated by the broken lines in FIG. 1A), which compresses refrigerant, and an electric motor 16, which drives the compression unit 15. Although not shown in the drawings, the compression unit 15 of the present embodiment includes a fixed scroll, which is fixed in the suction housing member 12, and a movable scroll, which is engaged with the fixed scroll.

A stator 17 is fixed to the inner surface of the suction housing member 12. The stator 17 includes a stator core 17a, which is fixed to the inner surface of the suction housing member 12, and coils 17b, which are wound around teeth (not shown) of the stator core 17a. A rotatable rotation shaft 19 extends through the stator 17 in the suction housing member 12. A rotor 18 is fixed to the rotation shaft 19.

Figure 1B:
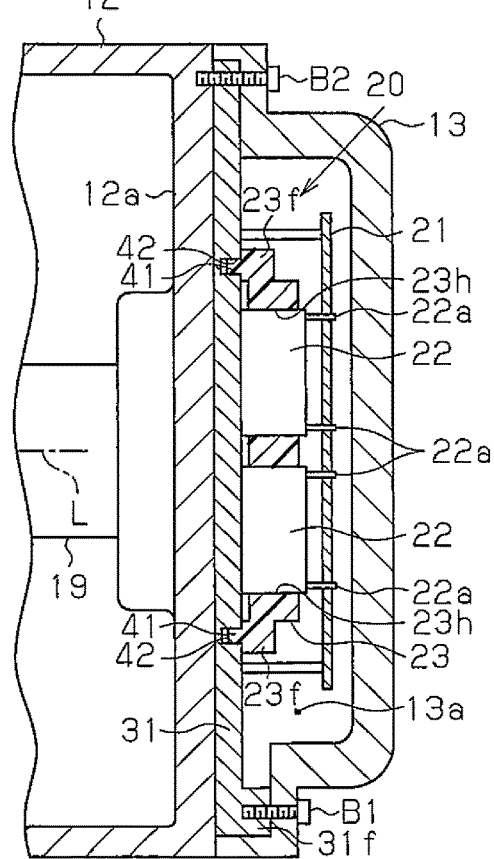
FIG. 1B is an enlarged cross-sectional view showing a motor driving circuit in the motor-driven compressor of FIG. 1A.

As shown in FIG. 1B, the suction housing member 12 has an end wall 12a (right side as viewed in FIG. 1B) to which the cover 13 is coupled. A planar coupling base 31 is arranged between the suction housing member 12 and the cover 13. The coupling base 31 is made of a metal, preferably aluminum. The coupling base 31, which is coupled to the end wall 12a of the suction housing member 12, is thermally bonded to the suction housing member 12. The coupling base 31 functions as a coupling member, which forms a portion of the housing H.

The cover 13 and the coupling base 31 define an accommodation chamber 13a in the housing H. The accommodation chamber 13a accommodates a motor driving circuit 20 that drives the electric motor 16. In the present embodiment, the compression unit 15, the electric motor 16, and the motor driving circuit 20 are arranged in this order along the axis L of the rotation shaft 19 (in the axial direction).

The electric motor 16 is supplied with power that is controlled by the motor driving circuit 20. This rotates the rotor 18 and the rotation shaft 19 at a controlled rotation speed and drives the compression unit 15. The driving of the compression unit 15 draws refrigerant from the external refrigerant circuit into the suction housing member 12 through the suction port, compresses the refrigerant in the suction housing member 12 with the compression unit 15, and discharges the compressed refrigerant to the external refrigerant circuit through the discharge port 14.

The motor driving circuit 20 includes a flat circuit board 21 and various types of electric components, which are electrically connected to the circuit board 21. The circuit board 21 is arranged in the accommodation chamber 13a such that the surface of the circuit board 21 on which the electric components are arranged is perpendicular to the axis of the rotation shaft 19. The electric components include film capacitors 22, for example. The motor driving circuit 20 includes a plurality of film capacitors 22. Each film capacitor 22 has a low, box-shaped profile. Each film capacitor 22 includes leads 22a that electrically connect the film capacitor 22 to the circuit board 21.

A plastic capacitor holder 23 holds the film capacitors 22. The capacitor holder 23 includes a plurality of holding holes 23h, each shaped to hold one of the film capacitors 22. The capacitor holder 23, which holds the film capacitors 22, is coupled to the side of the coupling base 31 that is opposite to the end wall 12a of the suction housing member 12.

A plurality of bosses 31f (only one is shown in FIG. 1B) projects from the surface of the coupling base 31 that is opposite to the end wall 12a of the suction housing member 12. Bolts B1 are inserted through the cover 13 and fastened to the bosses 31f to couple the coupling base 31 to the cover 13. This joins the cover 13, the coupling base 31, and the motor driving circuit 20 and forms a module. A bolt B2 fastens the cover 13, which is joined with the coupling base 31 and the motor driving circuit 20, to the suction housing member 12.

Figure 2:
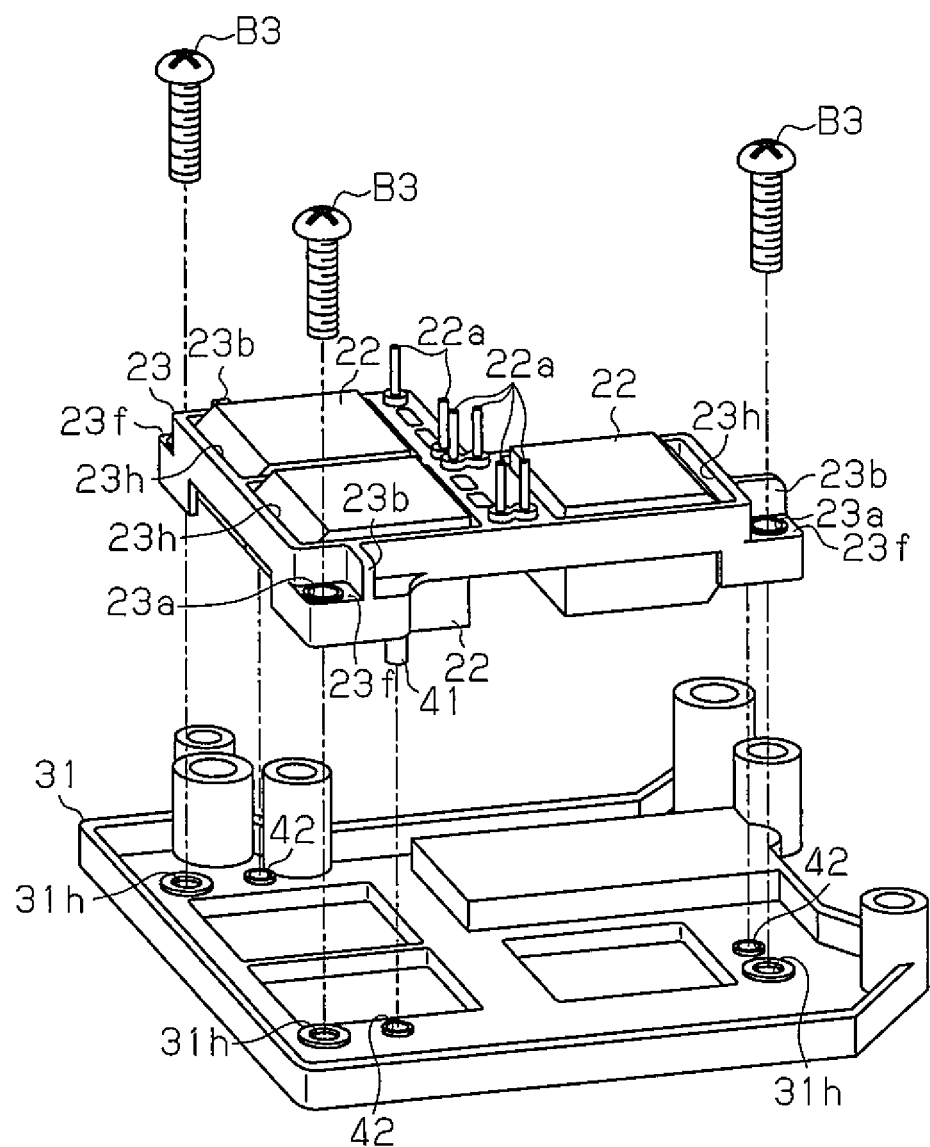
FIG. 2 is an exploded perspective view showing a coupling base and a capacitor holder holding film capacitors.

As shown in FIG. 2, the capacitor holder 23 includes a peripheral portion including a plurality of (two are shown in FIG. 1B) flanges 23f. Each flange 23f has a surface facing the coupling base 31 and including a positioning pin 41, which is also referred to as a projection. The positioning pin 41 is cylindrical and formed integrally with the corresponding flange 23f. The surface of the coupling base 31 opposite to the end wall 12a of the suction housing member 12 includes engagement recesses 42. Each engagement recess 42 functions as an engagement portion that engages with the corresponding one of the positioning pins 41.

Each flange 23f includes an insertion hole 23a into which a bolt B3 is inserted. In addition, the surface of the coupling base 31 opposite to the end wall 12a of the suction housing member 12 includes threaded holes 31h. The bolt B3 is inserted into the insertion hole 23a and engaged with a corresponding one of the threaded holes 31h. This fastens the capacitor holder 23 to the coupling base 31. Further, each flange 23f includes a planar reinforcement 23b projecting from the surface of the flange 23f that is opposite to the coupling base 31. The reinforcement 23b is located between the corresponding positioning pin 41 and the corresponding insertion hole 23a.

The operation of the present embodiment will now be described.

Figure 3:
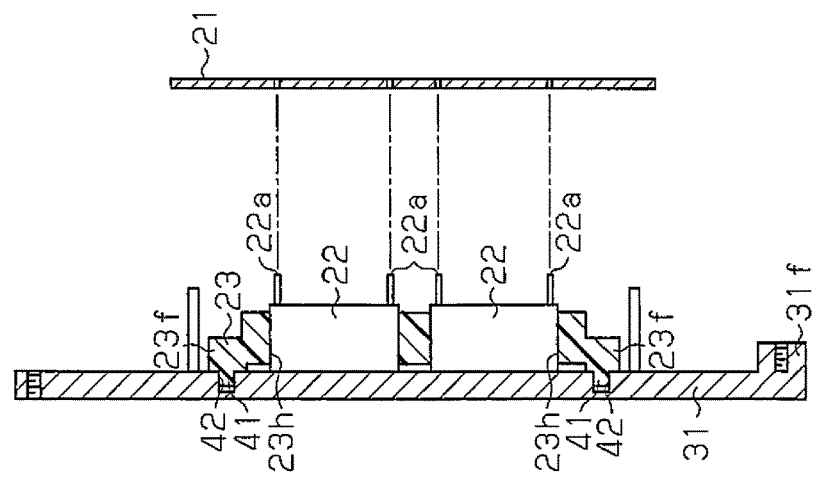
FIG. 3 is an exploded cross-sectional view showing the capacitor holder positioned relative to the coupling base.

As shown in FIG. 3, the engagement of the positioning pins 41 and the engagement recesses 42 positions the capacitor holder 23 relative to the coupling base 31. This restricts displacement of the capacitor holder 23 relative to the coupling base 31. Then, the capacitor holder 23, of which displacement is restricted, is fastened to the coupling base 31 with the bolts B3. When fastening the capacitor holder 23 to the coupling base 31, each reinforcement 23b, which reinforces the corresponding flange 23f, limits deformation of the flange 23f caused by the fastening force of the bolt B3.

In addition, when connecting the film capacitors 22, which are held in the holding holes 23h of the capacitor holder 23, to the circuit board 21, the leads 22a of the film capacitors 22 are not displaced from the corresponding connection locations of the circuit board 21. This facilitates connection of the film capacitors 22 to the circuit board 21.

Figure 4:
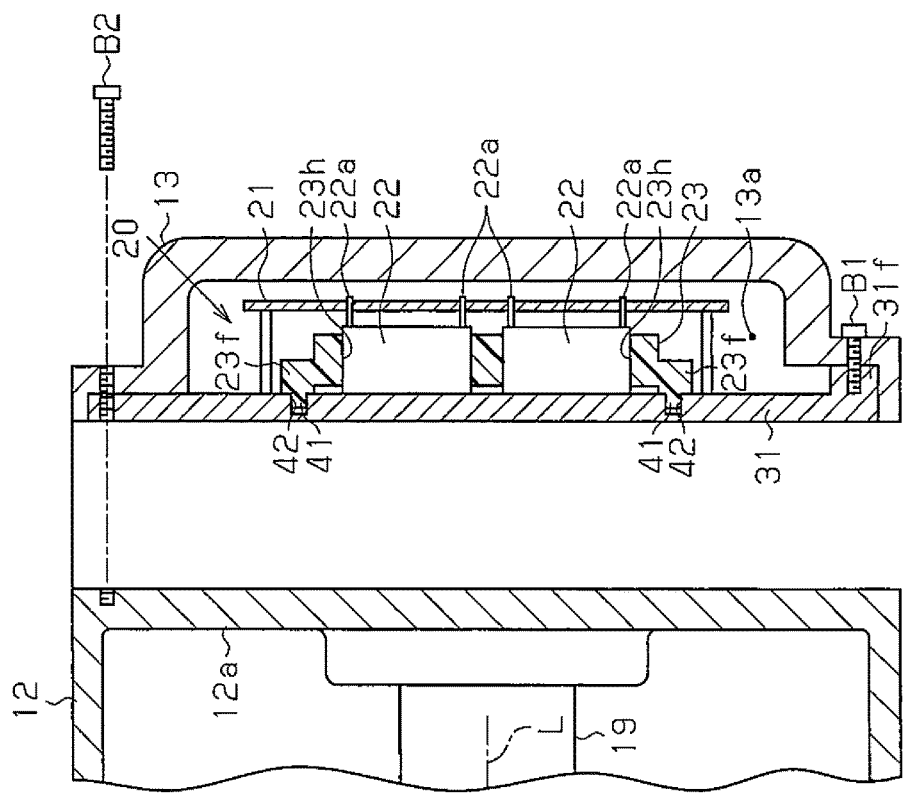
FIG. 4 is an exploded cross-sectional view showing the cover and the coupling base prior to attachment to the suction housing member.

As shown in FIG. 4, the cover 13, the coupling base 31, and the motor driving circuit 20 (capacitor holder 23) form a module. Thus, the coupling base 31 and the motor driving circuit 20 can be removed from the suction housing member 12 just by removing the cover 13 from the suction housing member 12. This facilitates maintenance of the motor driving circuit 20.

The advantages of the present embodiment will now be described.

(1) The surface of the capacitor holder 23 that faces the coupling base 31 includes the positioning pins 41. The surface of the coupling base 31 that is opposite to the end wall 12a of the suction housing member 12 includes the engagement recesses 42 that engage with the positioning pins 41. The engagement between the positioning pins 41 and the engagement recesses 42 positions the capacitor holder 23 relative to the coupling base 31, thereby limiting displacement of the capacitor holder 23 relative to the coupling base 31. This limits displacement of the film capacitors 22 from the connection locations of the circuit board 21 when connecting the circuit board 21 to the film capacitors 22 that are held by the capacitor holder 23, and facilitates the connection of the film capacitors 22 to the circuit board 21.

(2) The present embodiment includes the positioning pins 41 and the engagement recesses 42. Thus, compared to a structure including only one positioning pin 41 and one engagement recess 42, the capacitor holder 23 is positioned more accurately relative to the coupling base 31.

(3) The peripheral portion of the capacitor holder 23 includes the flanges 23f, each including a positioning pin 41 and an insertion hole 23a. The bolts B3 fasten the capacitor holder 23 to the coupling base 31 and ensure that the film capacitors 22, which are relatively heavy electric components, are fixed. This improves vibration resistance. In addition, each flange 23f includes the positioning pin 41 and the insertion hole 23a. This simplifies the structure of the capacitor holder 23 compared to a structure in which the positioning pin 41 and the insertion hole 23a are formed in separate flanges.

(4) Each flange 23f includes the reinforcement 23b between the positioning pin 41 and the insertion hole 23a. The reinforcement 23b reinforces the flange 23f. Thus, when coupling the capacitor holder 23 to the coupling base 31, the reinforcement 23b limits deformation of the flange 23f caused by the fastening force of the bolt B3.

(5) The cover 13 and the coupling base 31 define the accommodation chamber 13a of the motor driving circuit 20 in the housing H. This allows the cover 13, the coupling base 31, and the motor driving circuit 20 to form a module. Thus, the coupling base 31 and the motor driving circuit 20 can be removed from the suction housing member 12 just by removing the cover 13 from the suction housing member 12. This facilitates maintenance of the motor driving circuit 20.

It should be apparent to those skilled in the art that the present invention may be embodied in many other specific forms without departing from the spirit or scope of the invention. Particularly, it should be understood that the present invention may be embodied in the following forms.

Figure 5:
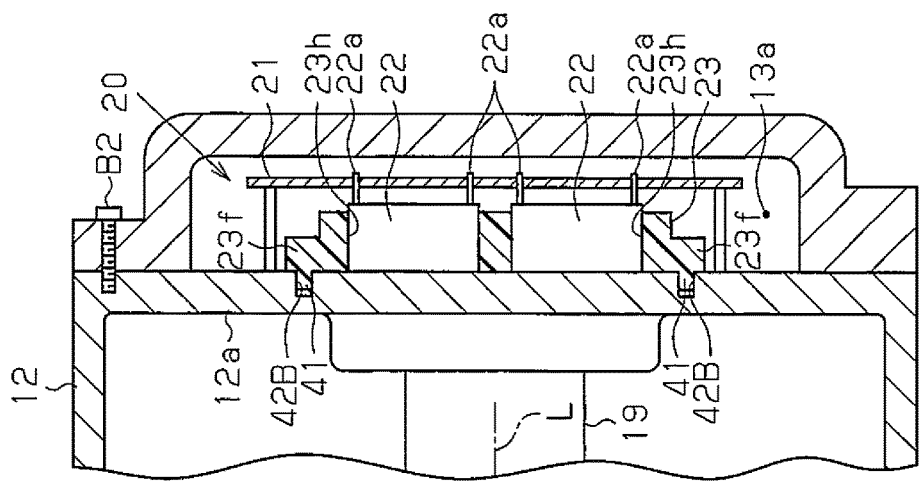
FIG. 5 is an enlarged cross-sectional view showing a motor driving circuit in another embodiment.

As shown in FIG. 5, the surface of the coupling base 31 that is opposite to the end wall 12a of the suction housing member 12 may include a plurality of positioning pins 41a, which function as projections. In addition, the surface of the capacitor holder 23 that faces the coupling base 31 may include engagement recesses 42A, which function as engagement portions that engage with the respective positioning pins 41A.

Figure 6:
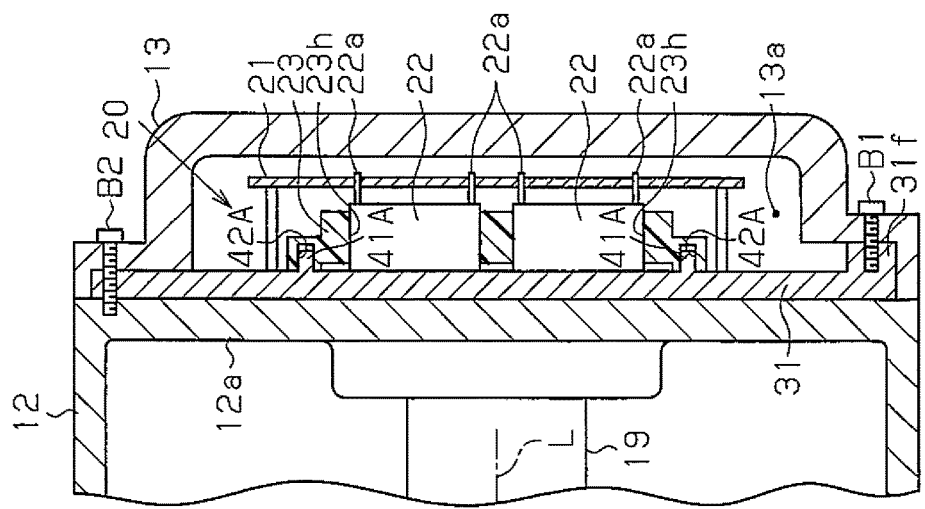
FIG. 6 is an enlarged cross-sectional view showing a motor driving circuit in a further embodiment.

As shown in FIG. 6, the coupling base 31 may be omitted, and the capacitor holder 23 may be directly coupled to the end wall 12a of the suction housing member 12. In this case, the end wall 12a of the suction housing member 12 functions as a coupling member to which the capacitor holder 23 is coupled. Further, the end wall 12a of the suction housing member 12 includes engagement recesses 42B that function as engagement portions engaged with the positioning pins 41.

The surface of the coupling base 31 that is opposite to the end wall 12a of the suction housing member 12 may include a wall functioning as a projection that engages with the peripheral wall of the capacitor holder 23. In this case, the peripheral wall of the capacitor holder 23 functions as an engagement portion that engages with the wall.

In the present embodiment, there is no limitation to the number of the positioning pins 41 and the number of the engagement recesses 42. For example, there may be only one positioning pin 41 and one engagement recess 42. In this case, the positioning pin 41 is shaped as a rectangular or triangular prism.

The positioning pins 41 do not have to be formed integrally with the flanges 23f of the capacitor holder 23. The positioning pins 41 may be discrete from the capacitor holder 23.

The positioning pin 41 and the insertion hole 23a do not have to be arranged in the same flange 23f and may be arranged in separate flanges.

Each flange 23f does not have to include the reinforcement 23b.

The number of the film capacitors 22 is not limited.

The capacitors may include an electrolytic capacitor, for example.

The motor driving circuit 20 may be located radially outward from the rotation shaft 19.

The compression unit 15 may be of a piston type or a vane type.

The present examples and embodiments are to be considered as illustrative and not restrictive and the invention is not to be limited to the details given herein, but may be modified within the scope and equivalence of the appended claims.

The invention claimed is:

1. A motor-driven compressor comprising:
a compression unit adapted to compress refrigerant;
an electric motor adapted to drive the compression unit;
a housing that accommodates the compression unit and the electric motor and includes a coupling member;
a motor driving circuit adapted to drive the electric motor, wherein the motor driving circuit includes a circuit board and a capacitor, which is electrically connected to the circuit board;
a capacitor holder that holds the capacitor and is coupled to the coupling member, the capacitor holder having a peripheral portion including a flange, wherein the flange comprises a first surface facing a coupling surface of the coupling member, a second surface opposite to the first surface, and a reinforcement projecting from the second surface,
wherein
the second surface of the flange and an outer peripheral side surface of the capacitor holder form an inside corner therebetween, and the reinforcement is connected to both the second surface of the flange and the outer peripheral side surface of the capacitor holder;
when viewing in a direction perpendicular to the second surface of the flange, the reinforcement divides the flange into a first portion and a second portion;
the first portion of the flange includes a projection extending from the first surface in a direction intersecting to the first surface, and the coupling surface of the coupling member includes an engagement recess that receives the projection extending from the first surface, and an engagement between the projection and the engagement recess positions the capacitor holder relative to the coupling member;
the second portion of the flange includes an insertion hole extending through the second portion from the first surface to the second surface,
wherein the insertion hole of the flange receives a bolt that couples the capacitor holder to the coupling member; and
wherein the reinforcement projecting from the second surface of the flange is located between the insertion hole and the projection when viewing in the direction perpendicular to the second surface of the flange.

2. The motor-driven compressor according to claim 1, wherein
the projection is one of a plurality of projections, and
the engagement recess is one of a plurality of engagement recesses.

3. The motor-driven compressor according to claim 1, wherein
the housing further includes a cover,
the cover and the coupling member define an accommodation chamber in the housing, and
the accommodation chamber accommodates the motor driving circuit.

4. The motor-driven compressor according to claim 1, wherein the capacitor includes a film capacitor.

5. The motor-driven compressor according to claim 1, further comprising a rotation shaft accommodated in the housing and rotated integrally with a rotor of the electric motor, wherein the compression unit, the electric motor, and the motor driving circuit are arranged in this order along an axis of the rotation shaft.

6. A motor-driven compressor comprising:
a compression unit adapted to compress refrigerant;
an electric motor adapted to drive the compression unit;
a housing that accommodates the compression unit and the electric motor and includes a coupling member;
a motor driving circuit adapted to drive the electric motor, wherein the motor driving circuit includes a circuit board and a capacitor, which is electrically connected to the circuit board;
a capacitor holder that holds the capacitor and is coupled to the coupling member, the capacitor holder having a peripheral portion including a flange, wherein the flange comprises a first surface facing a coupling surface of the coupling member, a second surface opposite to the first surface, and a reinforcement projecting from the second surface,
wherein
the second surface of the flange and an outer peripheral side surface of the capacitor holder form an inside corner therebetween, and the reinforcement is connected to both the second surface of the flange and the outer peripheral side surface of the capacitor holder;

when viewing in a direction perpendicular to the second surface of the flange, the reinforcement divides the flange into a first portion and a second portion;

the coupling surface of the coupling member includes a projection extending from the coupling surface in a direction intersecting to the coupling surface, and the first portion of the flange includes an engagement recess that receives the projection extending from the coupling surface, and an engagement between the projection and the engagement recess positions the capacitor holder relative to the coupling member;

the second portion of the flange includes an insertion hole extending through the second portion from the first surface to the second surface, wherein the insertion hole of the flange receives a bolt that couples the capacitor holder to the coupling member; and wherein the reinforcement projecting from the second surface of the flange is located between the insertion hole and the engagement recess when viewing in the direction perpendicular to the second surface of the flange.

7. The motor-driven compressor according to claim 6, wherein
the projection is one of a plurality of projections, and
the engagement recess is one of a plurality of engagement recesses.

8. The motor-driven compressor according to claim 6, wherein
the housing further includes a cover,
the cover and the coupling member define an accommodation chamber in the housing, and
the accommodation chamber accommodates the motor driving circuit.

9. The motor-driven compressor according to claim 6, wherein the capacitor includes a film capacitor.

10. The motor-driven compressor according to claim 6, further comprising a rotation shaft accommodated in the housing and rotated integrally with a rotor of the electric motor, wherein the compression unit, the electric motor, and the motor driving circuit are arranged in this order along an axis of the rotation shaft.

* * * * *